United States Patent
Watson et al.

(10) Patent No.: US 12,216,775 B2
(45) Date of Patent: *Feb. 4, 2025

(54) SYSTEMS AND METHODS FOR MEDIATING PERMISSIONS

(71) Applicant: Capital One Services, LLC, McLean, VA (US)

(72) Inventors: Mark Watson, Sedona, AZ (US);
Jeremy Goodsitt, Champaign, IL (US);
Austin Walters, Champaign, IL (US);
Anh Truong, Champaign, IL (US);
Vincent Pham, Champaign, IL (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/529,289

(22) Filed: Dec. 5, 2023

(65) Prior Publication Data

US 2024/0193286 A1 Jun. 13, 2024

Related U.S. Application Data

(63) Continuation of application No. 17/844,244, filed on Jun. 20, 2022, now Pat. No. 11,868,492, which is a continuation of application No. 16/849,723, filed on Apr. 15, 2020, now Pat. No. 11,392,707.

(51) Int. Cl.
| | |
|---|---|
| *G06F 21/60* | (2013.01) |
| *G06F 21/51* | (2013.01) |
| *G06N 20/00* | (2019.01) |
| *H04L 9/08* | (2006.01) |

(52) U.S. Cl.
CPC ............ *G06F 21/604* (2013.01); *G06F 21/51* (2013.01); *G06N 20/00* (2019.01); *H04L 9/0819* (2013.01)

(58) Field of Classification Search
CPC ....... G06F 21/604; G06F 21/51; G06N 20/00; H04L 9/0819
See application file for complete search history.

(56) References Cited

U.S. PATENT DOCUMENTS

| | | |
|---|---|---|
| 8,225,001 B2 | 7/2012 | Hart et al. |
| 8,433,764 B2 | 4/2013 | Rideout et al. |
| 9,591,003 B2 | 3/2017 | Johansson et al. |
| 9,628,477 B2 | 4/2017 | Smith et al. |
| 9,792,432 B2 | 10/2017 | Bilogrevic et al. |
| 9,825,962 B2 | 11/2017 | Seaward et al. |
| 2005/0114777 A1 | 5/2005 | Szeto |
| 2005/0114783 A1 | 5/2005 | Szeto |
| 2007/0113270 A1* | 5/2007 | Kraemer ............... G06F 21/604 726/4 |
| 2010/0275130 A1 | 10/2010 | McBride |

(Continued)

FOREIGN PATENT DOCUMENTS

WO 2020144455 A1 7/2020

*Primary Examiner* — Trong H Nguyen
(74) *Attorney, Agent, or Firm* — HUNTON ANDREWS KURTH LLP

(57) ABSTRACT

Systems and methods mediate permissions for applications on user devices using predictive models. Data communications are monitored on a user device for permission requests and responses. A predictive model is trained with these permission requests and responses until a threshold is met. Then, a default permission response is provided on behalf of the user device in response to a permission request.

20 Claims, 4 Drawing Sheets

(56) References Cited

U.S. PATENT DOCUMENTS

| | | | |
|---|---|---|---|
| 2012/0209914 A1 | 8/2012 | Sample et al. | |
| 2013/0346268 A1 | 12/2013 | Pereira et al. | |
| 2014/0149194 A1 | 5/2014 | Suganuma | |
| 2014/0207813 A1 | 7/2014 | Long et al. | |
| 2014/0324856 A1 | 10/2014 | Lahiani et al. | |
| 2014/0365910 A1 | 12/2014 | Laadan et al. | |
| 2015/0235043 A1 | 8/2015 | Haik et al. | |
| 2015/0365347 A1 | 12/2015 | Sanders | |
| 2015/0365366 A1 | 12/2015 | Prabhu | |
| 2015/0381602 A1* | 12/2015 | Grim | H04W 12/30 726/4 |
| 2016/0050287 A1 | 2/2016 | Golub et al. | |
| 2016/0072810 A1 | 3/2016 | Sarkar | |
| 2016/0162905 A1 | 6/2016 | Singh et al. | |
| 2016/0277410 A1 | 9/2016 | Kalb et al. | |
| 2016/0323307 A1 | 11/2016 | Savant | |
| 2017/0249453 A1 | 8/2017 | Voight et al. | |
| 2017/0373992 A1 | 12/2017 | Nair | |
| 2018/0077166 A1 | 3/2018 | Kovega | |
| 2018/0254961 A1* | 9/2018 | Achtermann | H04L 41/0686 |
| 2018/0302835 A1 | 10/2018 | Yamasaki et al. | |
| 2019/0122006 A1* | 4/2019 | Hurry | H04W 12/08 |
| 2020/0285983 A1 | 9/2020 | Bhattacharyya | |
| 2020/0356894 A1 | 11/2020 | Sklar et al. | |
| 2022/0103434 A1* | 3/2022 | Crowder | H04L 41/28 |

* cited by examiner

SYSTEMS AND METHODS FOR MEDIATING PERMISSIONS

CROSS-REFERENCE TO RELATED APPLICATION

This application is a continuation of U.S. patent application Ser. No. 17/844,244 filed Jun. 20, 2022, which is a continuation of U.S. patent application Ser. No. 16/849,723 filed Apr. 15, 2020, now U.S. Pat. No. 11,392,707, the complete disclosures of which are incorporated herein by reference in their entireties.

FIELD OF THE INVENTION

The present disclosure generally relates to permissions for applications on client devices and, in particular, to systems and methods for mediating permissions using predictive models.

BACKGROUND

Users live in an ecosystem of experiences with client devices. User's lives have become a series of interactions with devices, enabling each user to learn, buy, compare, search, navigate, connect, and manage nearly every aspect of modern life. Consider the hours of each day users spend interacting with their devices. Users interact with their smartphones, work on their laptops, engage with their tablets, watch shows on television, play with their video game consoles, and track steps on their fitness wristbands.

When a user installs an application or app on their client device, a response to a permission request is often required. For example, a pop-up menu might be displayed on their smartphone asking "Is it okay for application X to access service Y?" with selectable options "Deny" or "Allow." Permission requests can pop up the first time an app needs access for security purposes or to access to various data and resources on their client device. If a user installs a camera app on their device, for example, the app can request the user's permission to access the camera before it can take photos. Permission requests can be ongoing after an app is installed as well.

The ownership and sharing of data and resources can concern users as well as entities that create applications and apps. Privacy or security on a client device can be compromised by extending too much access to some sensitive data or resources that can be beyond the scope of the application or app or even be malicious, fraudulent or illegal.

For example, on a phone, it can be dangerous for a user to allow unrestricted access to their calling history, private messages, location, camera, or microphone. For example, a malicious app requesting access to health data from a fitness tracker or medical device could spy on your health. A malicious app requesting unneeded access to a user's calendar could spy on a user's personal routines or meeting times. A malicious app request access to a camera or microphone could secretly turn on the camera or microphone to record what's going on around the user. A common problem is an app that requests access to the user's contact list and then targets those contacts with spam, phishing or scams, etc.

While it can be important to a user to safeguard privacy and security on a client device, ubiquitous permission pop-ups can become repetitive and annoying, especially for everyday or routine use of the client device. A user can become frustrated by the time wasted in responding to previously allowed permission requests from a trusted source that are not a problem. A user could have been using a trusted app on a daily basis for a long time that has overly restrictive permission requests. Thus, a user would like to avoid the risks of giving too much access or accidentally allowing access to a bad actor, but at the same time a user doesn't want to be hassled by having to approve every little thing all of the time.

Accordingly, there are significant, and competing, needs to safeguard sensitive data in a practical, user-friendly and efficient way that improves the user's experience, trust and acceptance with applications and apps on the client device.

SUMMARY

The disclosed subject matter is directed to systems and methods for mediating permissions using predictive models that satisfy these needs.

An example embodiment of the present disclosure can be a permission mediating system that comprises a permissions monitor, a predictive model, and a permission mechanism. The permissions monitor can be configured to monitor communications between a client device and one or more applications; identify permissions requests and permissions responses communicated between the client device and the applications; and store the permissions requests and manual permissions responses in a database. The permissions requests can request permission from the client device to grant access to the applications. The manual permissions responses can either grant or not grant the requested access to the applications. The predictive model can be stored in a memory. The predictive model can be capable of predicting a default permissions response. The default permission response can be a predicted response to a current permissions request based on past permissions requests and manual permissions responses stored in the database by the permissions monitor. The permission mechanism can be configured to train the predictive model using the permission requests and manual permissions responses stored in the database by the permissions monitor; and provide the default permission response using the predictive model. The default permission response can include one or more of: an application type, a permission option, and a permission category. The permission mechanism can be further configured to transfer the predictive model to a second client device. The permission mediating can further comprise a cloud hosting service that encrypts and distributes the default permission response to a second client device. The permission mechanism can be further configured to change a unique identifier associated with the client device in the communications monitored by the permissions monitor. The default permission response can include a location associated with the client device. The predictive model can be pre-trained for some permission requests and manual permission responses.

An example embodiment can be a permission mediating method. A predictive model can be generated on a user device. The predictive model can be capable of predicting a default permissions response. The default permission response can be a predicted response to a current permissions request based on past permissions requests and manual permissions responses stored in a database. Data communications can be monitored on the user device for permission requests and permission responses. The permissions requests can request permission from the user device to grant access to applications and the permissions responses can either grant or not grant the requested access to the applications. Communicated permission requests and permission responses can be identified and stored in the database. The predictive model can be refined using the permission requests and permission responses stored in the database until a threshold is met. The default permission response can be provided from the predictive model. The default permission response can be provided on behalf of the user device in response to one of the permission requests. The predictive model can be transferred to a second user device. The predictive model can provide the default permission response on behalf of the second user device in response to one of the permission requests. The predictive model can be encrypted. The predictive model can be pre-trained for one or more selected from: (1) a type of permission, (2) a type of user, (3) a type of application, (4) a privacy setting, and (5) an operating system. The predictive model can be pre-trained for a type of service that sends one of the permission requests.

An example embodiment can be a permission mediating application. The permission mediating application can comprise a memory, a database, a permissions monitor and a permissions manager. The can contain a predictive model. The predictive model can be capable of predicting a default permissions response. The default permission response can be a predicted response to a current permissions request based on past permissions requests and manual permissions responses. The database can store permission requests and manual permission responses in data communications between a client device and one or more applications. The permissions requests can request permission from the client device to grant access to applications and the permissions responses can either grant or not grant the requested access to the applications. The permissions monitor can be configured to monitor data communications between the client device and one or more applications; identify communicated permissions requests and manual permission responses; and update the database with the communicated permissions requests and manual permission responses. The permissions manager can be configured to: train the predictive model for a user using the database until a threshold is met; and provide a default permission response on behalf of the user. The default permission response can comprises one or more features selected from: (1) application type, (2) permission options, and (3) permission category. The permission mediating application can further comprise a seed model that can be used initially as the predictive model. The seed model can be pre-trained for a generic user, pre-trained for a type of user, or pre-trained for a particular language. The permissions manager can change a location associated with the user. A notification mechanism can notify the user of the default permission response. The notification mechanism can allow the user to modify the default permission response. A family relationship manager can modify the default permission response. A user class manager can modify the default permission response.

These and other features, aspects and advantages of the disclosed subject matter are explained in greater detail with reference to specific example embodiments that are illustrated in the following description, appended claims, and accompanying drawings, in which like elements are indicated with like reference designators.

DETAILED DESCRIPTION OF EXAMPLE EMBODIMENTS

The following description of embodiments provides non-limiting representative examples referencing numerals to particularly describe features and teachings of different aspects of the invention. The embodiments described should be recognized as capable of implementation separately, or in combination, with other embodiments from the description of the embodiments. A person of ordinary skill in the art reviewing the description of embodiments should be able to learn and understand the different described aspects of the invention. The description of embodiments should facilitate understanding of the invention to such an extent that other implementations, not specifically covered but within the knowledge of a person of skill in the art having read the description of embodiments, would be understood to be consistent with an application of the invention.

Figure 1:
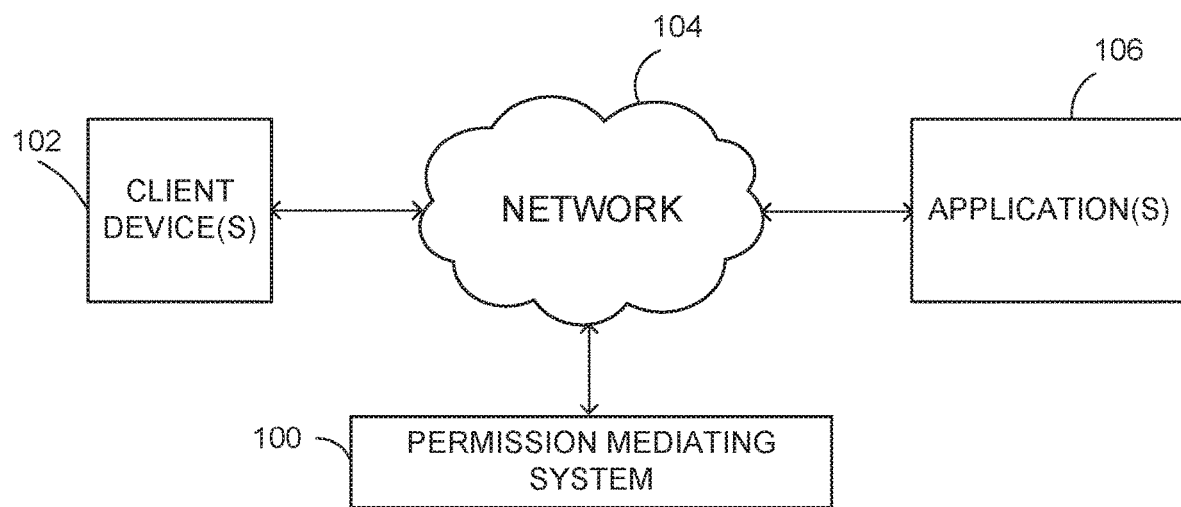
FIG. 1 is a diagram of a permission mediating system, according to an example embodiment of the disclosure.

FIG. 1 is a diagram of a permission mediating system 100, according to an example embodiment. Permissions mediating system 100 can act as an intermediary between one or more client devices 102 that can be connected by a network 104 to one or more applications 106. For example, permissions mediating system 100 can intercept the popup menu message "Is it okay for application X to access service Y?" sent from application 106 to client device 102 and provide a predicted response, such as "Allow" or "Deny" to application 106 on behalf of the user of client device 102.

Client device 102 can be a network-enabled computer. As referred to herein, a network-enabled computer can include, but is not limited to: e.g., any computer device, or communications device including, e.g., a server, a network appliance, a personal computer (PC), a workstation, a mobile device, a phone, a handheld PC, a personal digital assistant (PDA), a thin client, a fat client, an Internet browser, or other device. The one or more network-enabled computers can execute one or more software applications to enable, for example, network communications. A mobile device can include an iPhone, iPod, iPad from Apple® or any other mobile device running Apple's iOS operating system, any device running Google's Android® operating system, including for example, Google's wearable device, Google Glass, any device running Microsoft's Windows® Mobile operating system, and/or any other smartphone or any wearable mobile device.

Network 104 can be one or more of a wireless network, a wired network, or any combination of a wireless network and a wired network. For example, network 104 can include one or more of a fiber optics network, a passive optical network, a cable network, an Internet network, a satellite network, a wireless LAN, a Global System for Mobile Communication (GSM), a Personal Communication Service (PCS), a Personal Area Networks, (PAN), D-AMPS, Wi-Fi, Fixed Wireless Data, IEEE 802.11b, 802.15.1, 802.11n, and 802.11g or any other wired or wireless network for transmitting and receiving a data signal.

In addition, network 104 can include, without limitation, telephone lines, fiber optics, IEEE Ethernet 902.3, a wide area network (WAN), a local area network (LAN) or a global network such as the Internet. Also, network 104 can support an Internet network, a wireless communication network, a cellular network, or the like, or any combination thereof.

Network 104 can further include one network, or any number of example types of networks mentioned above, operating as a stand-alone network or in cooperation with each other. Network 104 can utilize one or more protocols of one or more network elements to which they are communicatively couples. Network 104 can translate to or from other protocols to one or more protocols of network devices. Although network 104 is depicted as a single network, it should be appreciated that according to one or more embodiments, network 104 can comprise a plurality of interconnected networks, such as, for example, the Internet, a service provider's network, a cable television network, corporate networks, and home networks.

Application 106 can be any software or program designed to perform any functions, tasks, or activities for the benefit of the user of client device 102. For example, application 106 can be a social networking application, such as Facebook®. Application 106 can be any web application or mobile app. A web application can run in part on client device 102 and in part on a server. For example, application 106 can be the web application Reddit, which runs in web browser Chrome® on a mobile phone and communicates over network 104. For example, application 106 can be mobile app Facebook®. The Facebook® app can be installed on a tablet as a front-end component supported by a backend component on a server and/or middleware components. Application 106 can be software as a service running from a remote cloud infrastructure. For example, application 106 can be a cloud-based app for email, calendaring or office tools. While client device 102 communicates over network 104 to run application 106, permission request and response messages can be monitored, intercepted, or changed by permission mediating system 100.

Permission mediating system 100 can be a network-enabled computer, a website, an online service or another network. Permission mediating system 100 can have components on client device 102 and/or application 106. Permission mediating system can be an intermediary server between client device 102 and a server hosting application 106, where application 106 can be software as a service that allows the user of client device 102 to execute and operate application 106 from a remote cloud infrastructure. Permission mediating system 100 can act like a gateway between client device 102 and the rest of network 104. Permission mediating system 100 can accept requests and respond to those requests in place of the user of client device 102 with the user's consent. Permission mediating system 100 can be a smart proxy intermediary for web interactions by client device 102. Permission mediating system 100 can act as a proxy to avoid geo-restrictions, increase security, avoid firewalls and bans, automate online processes, use multiple accounts, gather data, and for any other purpose or benefit to the user. Permission mediating system 100 can be a residential proxy, an anonymous proxy, a transparent proxy, or any other type of proxy.

Permission mediating system 100 can perform packet sniffing, which refers to network traffic analysis. When client device 102 communicates over network 104 to run application 106, data packets are sent and received and can be monitored, intercepted, or changed by permission mediating system 100. For example, permission mediating system 100 can analyze app traffic using a sniffer in the form of a proxy. The sniffer can provide visibility into network interactions in the form of HTTP or HTTPS requests and responses. The permission mediating system 100 can sift through the app traffic to find interactions related to permissions and manipulate the data. For example, permission mediating system 100 can intercept a request related to permissions and send back a predicted response on behalf of the user, before any permission popup is displayed on client device 102, saving the user time and aggravation. Permission mediating system 100 can use more than one proxy and can use different kinds of proxy tools, such as tools for manipulating data or logging.

Permission mediating system 100 can include tracking and other tools on client device 102. Permission mediating system 100 can include tracking tools that track the use of, for example, a phone, its apps, and browsers etc., and tools for overriding default properties and changing data. The tracking tools can use predictive analytics and big data technology to monitor information about permission requests and responses and to predict responses. For example, as a user installs an app on a phone, permission mediating system 100 can detect that the app is requesting permission for something, such as access to location and either monitor the request and the user response or, if the predictive model is ready, provide a predicted response on behalf of the user based on the user's pattern of responding to installing similar apps on their phone in the past.

Figure 2:
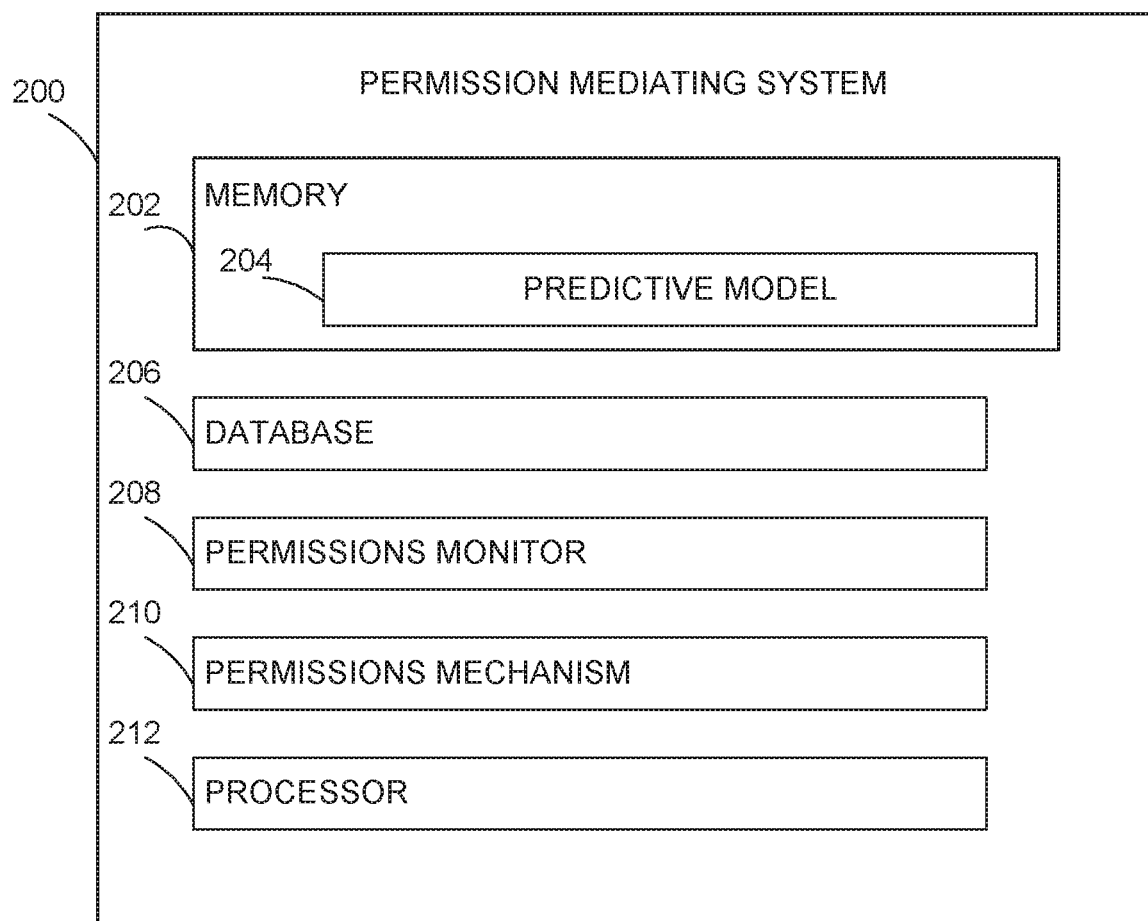
FIG. 2 is a diagram of a permission mediating system, according to an example embodiment of the disclosure.

FIG. 2 is a diagram of a permission mediating system 200, according to an example embodiment. Permission mediating system 200 can comprise a memory 202, a database 206, a permission monitor 208, a permission mechanism 210 and a processor 212. Memory 202 can store a predictive model 204 that generates a default permission response. For example, permissions mediating system 200 can receive the popup menu message "Is it okay for application X to access service Y?" and provide a default permission response, such as "Allow" or "Deny" based on predictive model 204. Predictive mediating system 200 can, for example, store the user's past permissions habits in data local to their smart phone for building predictive model 204 and for predicting which permissions the user is likely to approve in the future. Predictive model 204 can be used to predict a default value to provide on the user's behalf when a new permission is requested. Avoiding manual responses to popup menus can save the user time and possible frustration. Permission mediating system 200 can save the user from making a mistake. For example, the user might be in a hurry and click on a permission request that is similar to something that they have denied permissions for in the past. For example, if the user has always allowed a global positioning system (GPS) app on their phone to access location information, permission mediating system 200 can intercept the current popup request "Is it okay for GPS app to access location?" and automatically respond "Yes", without the user having to see the popup menu or select an option. The default permission response can occur in real time and can be based on both the user's historic interactions and also the predictive model that can be updated (e.g., transfer style learning) as a user uses predictive mediating system 200. The default permission response can be provided in response to a current permission request, in real time.

Memory 202 can include random access memory (RAM), dynamic RAM (DRAM), static RAM (SRAM), read-only memory (ROM) or any other type of internal, external, primary and/or secondary memory or storage device, such as hard disk drive (HDD), compact disk (CD) or universal serial bus (USB) flash drive, or database. Memory 202 can include database 206. Memory 202 can store software for execution by processor 212. For example, memory 202 can store information about what sorts of permissions that a user has typically approved over time.

Predictive model 204 can be a model generated by any kind of predictive analytics, such as statistical techniques from data mining, predictive modelling, machine learning, or artificial intelligence, which analyze current and historical data to make predictions about unknown future events. Predictive model 204 can be generated by a process, such as data mining and probability to forecast outcomes. For example, a smartcard or smartphone can have a dedicated AI chip and application programming interfaces (APIs) for using specialized hardware. The smartphone can have tools for machine learning, such as TensorFlow® Lite. The tools can be used to pick a model, convert the model to a file, deploy the model in a device, optimize the model, and the like.

Predictive model 204 can include a number of relevant predictors, which are variables that are likely to influence future events. For example, some relevant predictors can include a user's stored history indicating that the user almost always gives permission to a GPS app on their phone to access location information. Database 206 or memory 202 can store the user's history and relevant predictors. Another example can include a user's history of never allowing a particular genre of apps, such as gaming apps, access to their contacts list despite repeated requests.

Once data is collected for the relevant predictors, predictive model 204 can be formulated. Predictive model 204 can include a simple linear equation or it can be a complex neural network or any other type of statistical model. As additional data becomes available, predictive model 204 can be validated or revised. For example, before data is collected, permission mediating system 200 could not make predictions and then once a sufficient amount of data is collected, permission mediating system 200 can ask the user for permission to use certain default permission responses automatically. Predictive model 204 can be generated using any modeling method, such as predictive analytics, sampling, linear regressions, logistic regression, time series analysis, decision trees, Bayesian inference, neural networks, machine learning and the like. Predictive model 204 can be pre-trained for some permission requests and manual permission responses. For example, a generic predictive model 204 can be created and pre-trained for various types of users, client devices, platforms, operating systems, or apps, and so on. By starting with a seed model, predictive model 204 can be generated more efficiently.

Database 206 can store permission requests and responses from monitored data communications. Database 206 can be any organized collection of data accessible on permissions mediating system 200 and can be any type of database, such as a relational database management system (RDBMS) using structured query language (SQL). Database 206 can be stored in memory 202 or in a separate memory or storage device accessible by permissions mediating system 200.

Processor 212 can be a central processing unit (CPU), computer processor, microprocessor or any other type of processor. Processor 212 can perform any functions involved in operating permission mediating system 200, including input, output, operating system functions, network communications, controlling hardware and software, etc. For example, processor 212 can run one or more programs to build and refine predictive model 204 and to intercept the future or current popup request "Is it okay for GPS app to access location?" and automatically respond "Yes" based on predictive model 204. Processor 212 can execute permissions monitor 208 and permission mechanism 210.

Monitoring permission requests and responses can be done in many ways. The data associated with permission requests can include the text of popup messages from applications. The data associated with permission requests can include the type of application making the permission request. The data associated with permission requests can include the user's responses. In order monitor permission request and responses across different applications, capturing this information can be done at an operating system level. Captured data can be stored locally on a mobile device. For example, captured data can be stored using iOS® or Android® data storage application programming interfaces (APIs). Captured data can be uploaded to a central service, unless there are user privacy concerns.

Permissions monitor 208 can monitor data communications between a client device and one or more applications and update database 206, upon detection of a communicated permission request and a communicated manual permission response. For example, permissions monitor 208 can compare monitored data communications to known words or phrases that are commonly used in permission requests and responses, such as "would like to access your photos", "Don't allow", "OK", "would like to send you push notifications", "please allow microphone access" and the like. Permissions monitor 208 can include or have access to a network traffic sniffer, a browser extension associated with a web application, a tracker on a client device or anything capable of monitoring permissions requests and responses. Permissions monitor can include big data tools that selectively store information in memory 202 and/or database 206 for training predictive model 204.

Permission mechanism 210 can train predictive model 204 using a target and database 206. The target can be a dependent or target variable such as the user's permission response to a permission request. For example, a target variable might be whether the user generally allows push notifications for news apps on the user's phone. Predictive model 204 can be trained on a historical data to determine which data is useful and which data is not needed. For example, data unrelated to permissions can be ignored. When predictive model 204 is providing accurate predictions, it can be used to score real-time data. For example, permission mechanism 210 can elicit feedback from the user about a prediction to allow push notifications for a news app when a request occurs in real-time. For example, permission mediating system 200 might display "Would you like to set a default of allowing push notifications for news apps?" and provide options "Yes" or "No" to the user. Predictive model 204 can generate scores that are used in scorecards that help to predict the likelihood that a permission response is accurate. Predictive model 24 can be retrained periodically to adjust for changing behavior patterns. For example, a user might initially be overly broad in granting permissions but then scale back or change their mind, especially for certain types of apps, over time.

Permission mechanism 210 can predict the default permission response. For example, predictive model 204 can predict that when a new app is installed the user will approve certain kinds of permissions, given the app type and the user's previous history of approving permissions associated with installing apps on their smartphone. Permissions mediating system 200 can understand this pattern and intercept a permission request when a new app is installed and provide a predicted response on the user's behalf. This predicted response provided on the user's behalf can become a default response with the user's permission. Permission mechanism 210 can be a browser extension.

The default permission response can comprise one or more features including application type, permission options, and permission category. For example, application type can include games, business, education, lifestyle, entertainment, utilities, travel, book, health and fitness, and food and drink. For example, application type can include Facebook, Twitter, Amazon, and the like. For example, permission options can include location, camera, microphone, notifications, account info, contacts, calendar, call history, email, tasks, messaging, radios, other devices, background apps, app diagnostics, automatic file downloads, documents, pictures, videos, and file system. For example, permission category can include body sensor, calendar, camera, contacts, location, microphone, phone, SMS, and storage. The default permission response can include privacy permissions such as location services (GPS), contacts, calendars, reminders, Bluetooth, camera, health, HomeKit, and motion activity. The default permission response can include choosing which apps have the ability to use cellular data, such as a user's cellular data usage for a data plan or whether to only update or perform certain tasks when connected to Wi-Fi. The default permission response can include which apps can refresh their content while running in the background. The application type, permission options and/or permission categories can differ for various types of client devices, operating systems, common software platforms, shared services, internet of things (IOT) ecosystems, standards, or other factors. The application type, permission options, and/or permission categories can be discovered while training predictive model 204.

Permission mechanism 210 can transfer predictive model 204 from a first client device to a second client device. For example, a user can have a family account and many devices registered under that account on a common platform, such as Apple® and iCloud®. A parent can transfer their predictive model from their device to apply it to some or all of the other family members' devices. Permission mechanism can provide an option for a user who has multiple client devices to transfer a predictive model from one client device to another. For example, a user can transfer a predictive model from their laptop to their mobile phone. This transfer feature can include encrypting predictive model 204. This transfer feature can include modifying predictive model 204 to operate in a different operating system, platform, browser, or the like. This transfer feature can include a cross-platform product or a cloud hosting component.

Permission mediating system 200 can further comprise a cloud hosting service. The cloud hosting service can encrypt and distribute the default permission response to a second client device. Cloud hosting can be the procurement of computing resources from a cloud computing provider or facility to host data, services, and/or solutions. Cloud hosting can be an infrastructure as a service (IaaS) cloud delivery model that provides a suite of remote or virtual services.

Permission mechanism 210 can change a unique identifier associated with the client device in the network traffic monitored by permissions monitor 208. For example, the unique identifier can be a media access control (MAC) address of a client device. For example, the unique identifier can be an internet protocol (IP) address of a client device.

The default permission response can include a location associated with the client device. For example, a user could wish to keep their current location private and permission mediating system 200 can provide a way for a user to set a default permission response to include a particular, predefined location, such as their work location.

Figure 3:
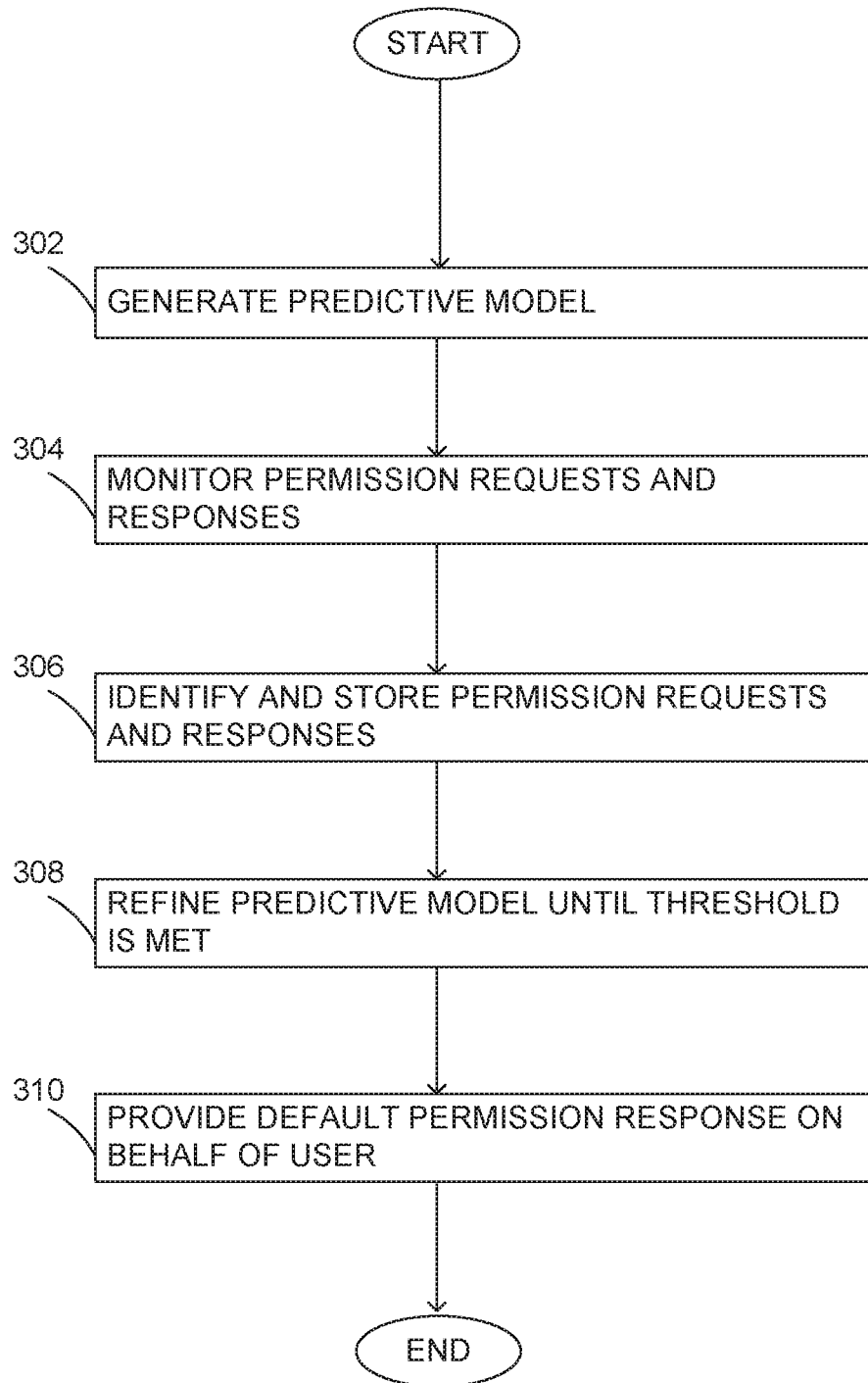
FIG. 3 is a flowchart of a permission mediating method, according to an example embodiment of the disclosure.

FIG. 3 is a flowchart of a permission mediating method 302, according to an example embodiment. Permission mediating method 300 starts at block 302. In block 302, a predictive model can be generated on a user device. For example, the predictive model can start with a blank slate and be ready for training on the user device. For example, the predictive model can initially be a seed model that is modeled on a typical person who cares about privacy, a typical person having some type of client device or some other emergent or identifiable category or classification. For example, the predictive model can be a text classification model that is pre-trained with machine learning, or other artificial intelligence processing. For example, the predictive model can be pre-trained with word embedding including frequently-used words in pop-ups requesting permissions, such as "photos", "location", or "reminders".

The predictive model can be pre-trained for one or more selected from: (1) a type of permission, (2) a type of user, (3) a type of application, (4) a privacy setting, and (5) an operating system. The predictive model can be pre-trained for a type of service that sends one of the permission requests. For example, the predictive model can be pre-trained for parents, children, seniors, or any other demographic group. For example, the predictive model can be pre-trained for denying access to private information associated with health insurance, medical records and/or fitness tracking. For example, the predictive model can be pre-trained for business travelers with default settings for sharing travel itineraries, flight schedules, car rentals, hotel bookings, and/or meeting information with apps associated with travel agencies, airlines, car rental companies, hotels and/or corporations. For example, the predictive model can be pre-trained for allowing access to location, health and/or identity information to public health and safety apps, emergency services and law enforcement agencies. For example, the predictive model can be pre-trained for operating systems, such as Microsoft Windows®, macOS® by Apple Inc., Linux®, Android® by Google LLC, iOS® by Apple Inc., or any other system software. For example, the predictive model can be pre-trained for any device from cellular phones and video game consoles to web servers and supercomputers.

In block 304, permission requests and permission responses can be monitored. There are many possible sources and ways to monitor and collect information related to permission requests and responses to be used to build and refine the predictive model. For example, network sniffers, browser extensions, device trackers, and other monitoring systems and methods can be used to monitor information related to permission requests and responses. For example, after starting with a seed model for the predictive model, every time a user interacts with a permission request, each request and the corresponding user's response can be used to refine the predictive model in accordance with the user's behavior. Many different predictive modeling systems and toolkits can be used to build and refine the predictive model using data collected from monitoring permission requests and responses. For example, some types of predictive models include ordinary least squares, generalized linear models, logistic regression, random forests, decision trees, neural networks, multivariate adaptive regression splines, and others. For example, some predictive analytics toolkits include tools for data audit learning, creating an analytical file, data management, integration, analytics, modeling, and the like.

In block 306, communicated permission requests and permission responses can be identified and stored in a database. Each permission request and corresponding response can be interpreted and can be indexed and saved or logged in a form that can be used with the predictive modeling. The database can include, for example, data stored in memory on a client device or data stored in a separate storage device. For example, every time the user interacts with something, such as a popup, on a device and they have to give their permission, data related to each interaction can be stored locally on the device and used to refine the predictive model.

In block 308, the predictive model can be refined using the permission requests and permission responses stored in the database until a threshold is met. For example, at some point after generating an initial predictive model, when there can be sufficient data about the user's permission habits to make a prediction, the permission mediating system can determine it is ready to provide a predicted permission response on behalf of the user. For example, a user can interact with permission settings on a web browser, laptop, tablet, or phone in some manner over some reasonable period of time that can be monitored and allow a prediction to be made. For example, a user can show a reliable pattern of allowing a shopping website to access account information or a user can show a trend of custom permission levels for social networking apps. There are many different tests that can be used to determine the accuracy of predictive models. For example, data mining techniques can be used, such as identifying previously unrecognized patterns and trends, identifying the best set of predictors, scoring and ranking, target shuffling, bootstrap sampling, and other methods.

In block 310, a default permission response from the predictive model can be provided on behalf of the user device in response to one of the permission requests. For example, a permission mediating system can ask a user for permission to start to automatically provide a default permission response to a permission request, such as "Would you like to set a default account permission for this shopping website?" with options "Yes" or "No". Then, upon receiving consent (e.g., "Yes") from the user, the system can provide that default account permission response to a future or current account permission request from that shopping website. For example, the system can show the user a graph or table of their account permission responses for this shopping website over time and perhaps allow the user to modify a displayed predicted response based on that historical data. For example, after a permission mediating system suggests a default permission response, the system might also request whether the user would like to continue having this or similar permissions predicted or whether the user would like to turn off this functionality. For example, a permission mediating system might notice a trend of changing a particular type or class of permissions and suggest changing similar permissions for similar permission requests to a new default permission response in the future. For example, the system can suggest "In the past, you set defaults denying location access to apps X, Y, and Z. Would you like to deny location access to app A as well?"

According to an example embodiment, the predictive model can be transferred to a second user device and provide the default permission response on behalf of the second user device in response to one of the permission requests. For example, the predictive model and/or a default permission response can be distributed to one or more devices through a cloud service. For example, a predictive model can be trained for a generic user, a location, a language and/or country and then transferred to a client device. A generic seed model can be created and then refined to make a seed model for Android®, a seed model for IOS®, a seed model for Chrome® or Safari® web browser, and other types of seed models. A seed model can be created for various locations, such as major cities or metro areas. A seed model can be created for different languages and transferred to devices with those languages set as the default language. A seed model can be a starting default model for new users. A seed model can be a starting default model when a user changes devices. A predictive model can be converted to a file and then shared with another device or transferred from one device to another. For example, a predictive model created using TensorFlow® Lite can be converted using the Python® API to an efficient model format using a flat buffer that is optimized for small size and portability and can be deployed on mobile phone platforms, such as iOS® or Android®. For example, TensorFlow® Lite can allow use of pre-trained and re-trained models. For example, TensorFlow® can be used with cloud services, such as Google or Amazon Web Services.

Figure 4:
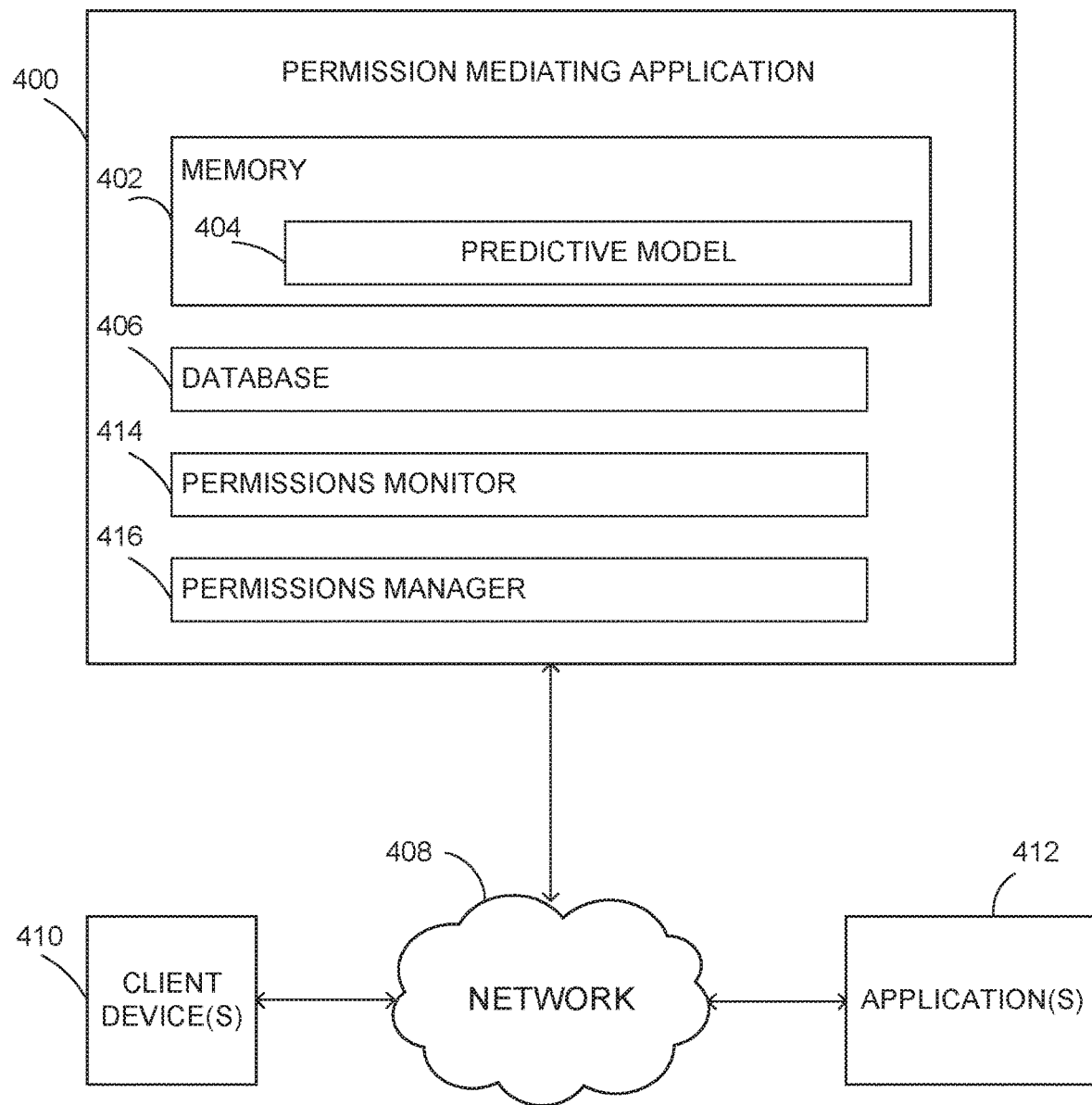
FIG. 4 is a diagram of a permission mediating application, according to an example embodiment of the disclosure.

FIG. 4 is a diagram of a permission mediating application 400, according to an example embodiment. Permission mediating application 400 can be an application or app that is capable of being stored, copied, distributed, installed and/or deployed on any device capable of running the application. For example, a user can download and install permission mediating application 400 from a website onto a mobile device. For example, a mobile device can be pre-configured for members of an organization to include permission mediating application 400.

Permission mediating application 400 can comprise a memory 402, a database 406, a permissions monitor 414, and a permissions manager 416. Memory 402 can be any type of memory on any type of device that is capable of running permission mediating application 400, such as RAM on a laptop. Memory 402 can contain a predictive model 404. Predictive model 404 can be any kind of model capable of predicting a response to a future or current permission request based on any collection of prior data and/or statistics. For example, predictive model 404 can be generated by permission mediating application 400 using ordinary least squares, generalized linear model, logistic regression, random forest, decision tree, neural network, multivariate adaptive regression splines, machine learning, naïve Bayes classifier, predictive analytics, artificial intelligence and/or any combination of techniques. Database 406 can be part of memory 402 or another data storage. Database 406 can be a structured set of data, such as a database management system or any collection of related data accessible by permission mediating application 400. Database 406 can store permission requests and manual permission responses in data communications over a network 408 between a client device 410 and one or more applications 412.

Permissions monitor 414 can monitor user interactions on client device 410 and with applications 412, identify communicated permissions requests and manual permission responses, and update database 406 with the communicated permissions requests and manual permission responses. Client interactions can give rise to a permission request. For example, installing an app can trigger a permission request to access hardware, such as a camera. For example, permissions monitor 414 can be part of a browser extension or background program on a device that is capable of monitoring a user's responses to various permission requests from various web interactions, applications or apps, such as those for meetings, chatting, news, weather, social network, gaming, productivity, email, messaging, education, etc. Permissions monitor 414 can ignore data communications unrelated to permissions and can passively record information in data communications related to permissions. For example, permissions monitor 414 can store data in database 406 when, for example, a user clicks "Accept" in response to one or more requests about whether the user wants notifications on a social network, such as Reddit® or Facebook®. For example, permissions monitor 414 can initially request permission from the user to monitor data communications for permissions requests and responses. For example, permissions monitor 414 can store data in database 406 when a user modifies a setting related to permissions on a messaging app, such as message popup notification in WhatsApp®. For example, permission monitor 414 can store data in database 406 when an app requests access to permissions settings or resources or features on a phone. For example, permissions monitor 414 can store data in database 406 when a user responds to cookie consent prompts, push notifications, permissions requests, third party tracking, reminders, messages, social updates, onboarding, and the like.

Some permission requests monitored by permissions monitor 414 can demand immediate attention and feel overwhelming or invasive to a user. Users can not want to miss important notifications or miss out on timely information, but they don't want to feel pestered by a never-ending flood of noisy updates either. User behavior can change over time or vary depending on context.

Permissions manager 416 can use data stored in database 406 by permissions monitor 414 to train predictive model 404. Permissions manager 416 can train predictive model 404 for a user with a target and database 406 until a threshold is met and provide a default permission response on behalf of the user. Providing an automatic response on behalf of the user can relieve the user and allow them to calmly focus their attention without interruption by permission requests.

The target can be a target variable in predictive analytics. Permissions manager 416 can define one or more target variables whose values are to be modeled and predicted by other variables. Permissions manager 416 can use a predictor variable to predict the value of the target variable. Permissions manager 416 can use machine learning, for example. In machine learning, a target variable of a dataset can be a feature needing deeper understanding, where a machine learning process uses historical data to learn patterns and uncover relationships between other features of the dataset and the target variable. Permissions manager 416 can use machine learning or any kind of predictive modeling to train predictive model 404.

The threshold can be defined, set, revised, selected and/or chosen by permission manager 416 as part of deciding when it might be appropriate to make a prediction based on any number of factors, such as accuracy, size of dataset, statistics, probability model, classification model, or any measure of success, while training predictive model 404. For example, permissions manager 416 can train predictive model 404 until there is a certain amount of user engagement, such as a number of page visits, a few interactions, or a certain amount of time spent using certain websites, applications, or apps. Permissions manager 416 can train predictive model 404 until there is a statistically relevant amount data monitored and/or stored by permission monitor 414. For example, permissions manager 416 can use any relevant metric as a threshold, such as permission acceptance versus rejection ratios. The threshold can be determined taking into account, for example, the urgency, length, or frequency of permission requests and responses in database 406.

The default permission response can comprise one or more features selected from: (1) application type, (2) permission options, and (3) permission category. Application type can be categorized in many different ways with varying granularity from general to specific and considering various aspects that can be relevant to various types of users. For example, application type can be word processing, spreadsheet, desktop publishing, database, communications, presentation, internet browser, graphics, or email program. For example, application type can be business, personal, entertainment, social. For example, application type can be based on types of operating systems, platforms, organizational boundaries, producers, end-users, hardware, software, and/or ecosystems. For example, application type can be based on relationships with vendors, suppliers, and third parties.

Permission options can include, for example, enabling, disabling, allowing, and/or denying. Permission options can include a collection of settings specific to applications, operating systems, platforms, hardware, organizations, groups and the like. Permission options can include various levels and classifications. Permission options can include access type such as read, write, execute, and delete. Permission options can include actions such as add, modify, change, control, send, remove, or adjust.

For example, permission options for a social networking app can include: add or modify calendar events and send email to guests without owner's knowledge; add or remove accounts, adjust user wallpaper size; approximate location (network-based); change network connectivity; change user audio settings; connect and disconnect from Wi-Fi; control vibration; create accounts and set passwords; directly call phone numbers; download files without notification; draw over other apps; expand collapse status bar; find accounts on the device; full network access; install shortcuts; modify or delete the contents of user USB storage; modify user contacts; precise location (GPS and network-based); prevent device from sleeping; read battery statistics; read calendar events plus confidential information; read call log; read google service configuration; read phone status and identity; read sync settings; read user contacts; read user's own contact card; read user text messages (SMS or MMS); receive data from internet; record audio; re-order running apps; retrieve running apps; run at startup; send sticky broadcast; set wallpaper; take pictures and videos; test access to protected storage; toggle sync on and off; view network connections; view Wi-Fi connections; and write call log.

For example, permission options for a communication app can include: add or remove accounts; approximate location (network-based); change user audio settings; connect and disconnect from Wi-Fi; control vibration; create accounts and set passwords; directly call phone numbers; find accounts on the device; full network access; install shortcuts; modify or delete the contents of user USB storage; modify system settings; modify user contacts; precise location (GPS and network-based); prevent device from sleeping; read google service configuration; read phone status and identity; read sync settings; read sync statistics; read user contacts; read user's own contact card; receive data from internet; receive text messages (SMS); record audio, retrieve running apps; run at startup; send SMS messages; take pictures and videos; test access to protected storage; toggle sync on and off; uninstall shortcuts; use accounts on the device; view network connections; and view Wi-Fi connections.

For example, permission options for a travel and location app can include: add or remove accounts; approximate location (network-based); connect and disconnect from Wi-Fi; control near field communication; control vibration; directly call phone numbers; disable user screen lock; find accounts on the device; full network access; google maps; install shortcuts; modify or delete the contents of user USB storage; modify user contacts; precise location (GPS and network-based); prevent device from sleeping; read call log; read google service configuration; read phone status and identity; read user contacts; receive data from internet; record audio; retrieve running apps; run at startup; test access to protected storage; use accounts on the device; view configured accounts; view Wi-Fi connections; and write call log.

For example, permission options for a media and audio app can include: change user audio settings; control near field communication; find accounts on the device; full network access; modify or delete the contents of user USB storage; prevent device from sleeping; read phone status and identity; receive data from internet; send sticky broadcast; test access to protected storage; view network connections; and view Wi-Fi connections.

For example, permission options for a communication app can include: add or remove accounts; control near field communication; control vibration; download files without notification; find accounts on the device; full network access; allow apps to sign in to mail service using accounts stored on device; modify email including sending and deleting email; modify or delete the contents of user USB storage; modify user contacts; prevent device from sleeping; read call log; read email; read google service configuration; read subscribed feeds; read sync settings; read sync statistics; read user contacts; run at startup; send email; test access to protected storage; toggle sync on and off; use accounts on the device; view network connections; write call log; and write subscribed feeds.

For example, permission options for a social media app can include: change screen orientation; find accounts on the device; full network access; modify or delete the contents of your USB storage; precise location (GPS and network-based); prevent device from sleeping; read battery statistics; read frame buffer; read user contacts; read user's own contact card; receive data from internet; record audio; retrieve running apps; take pictures and videos; test access to protected storage; and view network connections.

Permission categories can be related to application type and permission options. Permission categories can be, for example, application, normal, signature and dangerous. For example, permission categories can be based on categories determined by predictive model 404. Permission categories can include, for example, application, system resources, personal information, contact information, network access, network connections, location information, software, hardware, data storage, connected devices.

Permission mediating application 400 can further comprise a seed model that is pre-trained for a generic user and used initially as the predictive model. For example, a generic user can be based on a type of device, operating system, browser, service provider, bundle of services, sales, marketing, business, organization, distribution, country, language, and the like.

The permission mediating application can further comprise a seed model that is pre-trained for a type of user and used initially as the predictive model. For example, a type of user can be a user who cares about privacy, a family member who cares about parental controls, a business traveler, a government employee with security concerns, and other types of users.

Permission mediating application 400 can further comprise a seed model that is pre-trained for a particular language and used initially as predictive model 404. For example, Portuguese, French, English and other languages that can be used in permission request and response popups or settings.

Permission manager 416 can change a location associated with the user. For example, a user concerned with privacy can fake or spoof a GPS location on their phone or browser.

Permission mediating application 400 can further comprise a notification mechanism that notifies the user of the default permission response. The notification mechanism can allow the user to modify the default permission response. For example, permission mediating application 400 can periodically provide a log or summary of permissions set on the user's behalf since the last time the user checked. For example, permission mediating application 400 can allow the user to modify a default permission for future use or provide other feedback that can help further refinement of predictive model 404.

Permission mediating application 400 can further comprise a family relationship manager that modifies the default permission response. For example, a parent can be provided with two options: a first option for parents to control profiles for children and a second option for teenagers who they trust to make their own decisions.

Permission mediating application 400 can further comprise a user class manager that modifies the default permission response. For example, a company can need to manage certain classes of user as a group and override the default permission response.

In this description, numerous specific details have been set forth. It is to be understood, however, that implementations of the disclosed technology can be practiced without these specific details. In other instances, well-known methods, structures and techniques have not been shown in detail in order not to obscure an understanding of this description. References to "some examples," "other examples," "one example," "an example," "various examples," "one embodiment," "an embodiment," "some embodiments," "example embodiment," "various embodiments," "one implementation," "an implementation," "example implementation," "various implementations," "some implementations," etc., indicate that the implementation(s) of the disclosed technology so described can include a particular feature, structure, or characteristic, but not every implementation necessarily includes the particular feature, structure, or characteristic. Further, repeated use of the phrases "in one example," "in one embodiment," or "in one implementation" does not necessarily refer to the same example, embodiment, or implementation, although it could.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

While certain implementations of the disclosed technology have been described in connection with what is presently considered to be the most practical and various implementations, it is to be understood that the disclosed technology is not to be limited to the disclosed implementations, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain implementations of the disclosed technology, including the best mode, and also to enable any person skilled in the art to practice certain implementations of the disclosed technology, including making and using any devices or systems and performing any incorporated methods. The patentable scope of certain implementations of the disclosed technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A permission mediating system, comprising:
   a memory;
   a processor;
   a permissions monitor, wherein the permissions monitor includes at least one selected from a group consisting of a network traffic sniffer, a browser extension associated with a web application, and a tracker on a client device, and is configured to:
      request a permission from a user of the client device to monitor data communications for permissions requests and permissions responses;
      monitor the permissions requests and the permissions responses communicated between the client device and one or more applications;
      ignore data communications unrelated to the permissions requests and the permissions responses; and
      update a database with the communicated permissions requests and the communicated permissions responses;
   a predictive model, wherein the predictive model is capable of predicting a default permission response to a future or current permission request based on the communicated permissions requests and the communicated permissions responses; and
   a permissions manager executed by the processor, wherein the permission manager is configured to:
      train the predictive model with a target and the communicated permissions requests and the communicated permissions responses, the target being a target variable in predictive analytics; and
      provide the default permission response to the future or current permission request using the predictive model.

2. The permission mediating system of claim 1, wherein the default permission response includes one or more of: an application type, a permission option, and a permission category.

3. The permission mediating system of claim 1, wherein:
   the permissions requests requesting permission from the client device to grant access to the one or more applications, and
   the permissions responses either granting or not granting the requested access to the one or more applications.

4. The permission mediating system of claim 1, wherein the permissions manager is further configured to:
   select a seed model for training the predictive model based on a location associated with the client device, and
   train the predictive model using the seed model.

5. The permission mediating system of claim 4, wherein:
   the seed model is pre-trained for a generic user, and
   the seed model is used initially as the predictive model.

6. The permission mediating system of claim 4, wherein:
   the seed model is pre-trained for a type of user, and
   the seed model is used initially as the predictive model.

7. The permission mediating system of claim 6, wherein the type of user is associated with a type of client device.

8. The permission mediating system of claim 6, wherein the type of user is associated with an identifiable category.

9. The permission mediating system of claim 4, wherein:
   the seed model is pre-trained for a particular language, and
   the seed model is used initially as the predictive model.

10. The permission mediating system of claim 1, wherein the permissions manager is further configured to change a unique identifier associated with the client device in the data communications monitored by the permissions monitor.

11. A method, comprising:
    requesting, by a permissions monitor, a permission from a user of a client device to monitor data communications for permissions requests and permissions responses, wherein the permissions monitor includes at least one selected from a group consisting of a network traffic sniffer, a browser extension associated with a web application, and a tracker on the client device;
    monitoring, by the permissions monitor, the permissions requests and the permissions responses communicated between the client device and one or more applications;
    ignoring, by the permissions monitor, data communications unrelated to the permissions requests and the permissions responses;
    updating, by the permissions monitor, a database with the communicated permissions requests and the communicated permissions responses;
    training, by a permissions manager, a predictive model with a target and the communicated permissions requests and the communicated permissions responses, wherein the target is a target variable in predictive analytics, and the predictive model is capable of predicting a default permission response to a future or current permission request based on the communicated permissions requests and the communicated permissions responses; and
    providing, by the permissions manager, the default permission response to the future or current permission request using the predictive model.

12. The method of claim 11, further comprising refining, by the permissions manager, the predictive model using the communicated permissions requests and the communicated permissions responses stored in the database until a threshold is met.

13. The method of claim 12, wherein the threshold comprises a ratio of permission acceptances to permission rejections.

14. The method of claim 12, wherein the threshold comprises a threshold level of user engagement.

15. The method of claim 12, wherein the threshold comprises an amount of data.

16. The method of claim 11, further comprising encrypting and distributing, by a cloud hosting service, the default permission response to a second user device.

17. The method of claim 11, further comprising transferring the predictive model to a second user device, wherein the predictive model provides the default permission response on behalf of the second user device in response to one of the permissions requests.

18. The method of claim 11, wherein the predictive model is pre-trained for one or more selected from: (1) a type of permission, (2) a type of user, (3) a type of application, (4) a privacy setting, and (5) an operating system.

19. The method of claim 11, wherein the predictive model is pre-trained for a type of service that sends one of the permissions requests.

20. A permission mediating system, comprising:
a processor;
a memory containing a predictive model, the predictive model being capable of predicting a default permission response;
a database storing permissions requests and permissions responses in data communications between a client device and an application;
a permissions monitor, executed by the processor, configured to:
request a permission from a user of the client device to monitor data communications for the permissions requests and the permissions responses,
monitor the permissions requests and the permissions responses communicated between the client device and the application, and
ignore data communications unrelated to the permissions requests and the permissions responses; and
a permissions manager, executed by the processor, configured to:
select a seed model for training the predictive model based on a location associated with the client device,
train the predictive model using the seed model, the permissions requests, and the permissions responses stored in the database, and
provide the default permission response using the predictive model.

\* \* \* \* \*